(12) United States Patent
Bernstein et al.

(10) Patent No.: US 6,501,045 B1
(45) Date of Patent: Dec. 31, 2002

(54) METHOD AND APPARATUS FOR CONTROLLING THE TAPER ANGLE OF THE WALLS OF LASER MACHINED FEATURES

(75) Inventors: Jeffrey Bernstein; Pascal Miller, both of Nashua, NH (US); Hideyuki Morishita, Yorkaichi (JP)

(73) Assignees: Resonetics, Inc., Nashua, NH (US); Kawamura Sangyo Co., Ltd. (JP)

( * ) Notice: Subject to any disclaimer, the term of this patent is extended or adjusted under 35 U.S.C. 154(b) by 0 days.

(21) Appl. No.: 09/544,032

(22) Filed: Apr. 6, 2000

(51) Int. Cl.[7] .............................................. B23K 26/06
(52) U.S. Cl. .............................. 219/121.69; 219/121.74
(58) Field of Search ...................... 219/121.69, 121.68, 219/121.67, 121.8, 121.7, 121.71, 121.72, 121.74; 359/198, 202

(56) References Cited

U.S. PATENT DOCUMENTS

| | | | |
|---|---|---|---|
| 3,576,965 A | 5/1971 | Gugger | |
| 4,044,222 A | 8/1977 | Kestenbaum | |
| 4,328,410 A | 5/1982 | Slivinsky et al. | |
| 4,469,098 A | 9/1984 | Davi | 17/36 |
| 4,979,290 A * | 12/1990 | Chiba | |
| 5,043,553 A | 8/1991 | Corfe et al. | |
| 5,189,437 A | 2/1993 | Michaelis et al. | 2/45 |
| 5,213,876 A * | 5/1993 | Smyth, Jr. et al. | |
| 5,223,692 A * | 6/1993 | Lozier et al. | |
| 5,284,478 A | 2/1994 | Hanna et al. | 5/6 |
| 5,539,175 A * | 7/1996 | Smith et al. | |
| 5,550,346 A * | 8/1996 | Andriash et al. | |
| 5,609,778 A | 3/1997 | Pulaski et al. | 26/6 |
| 5,609,779 A | 3/1997 | Crow et al. | 26/8 |
| 5,688,418 A | 11/1997 | Yoshiyasu et al. | |
| 5,800,424 A | 9/1998 | Sumiya | 5/6 |
| 5,837,964 A | 11/1998 | Emer et al. | 26/8 |
| 5,841,099 A * | 11/1998 | Owen et al. | |
| 5,965,043 A * | 10/1999 | Noddin et al. | |
| 5,973,290 A * | 10/1999 | Noddin | |
| 5,998,759 A * | 12/1999 | Smart | |
| 6,107,600 A * | 8/2000 | Kurosawa | |

* cited by examiner

Primary Examiner—Tom Dunn
Assistant Examiner—Jonathan Johnson
(74) Attorney, Agent, or Firm—Devine, Millimet & Branch, PA; Paul C. Remus; Todd A. Sullivan

(57) ABSTRACT

A new method and apparatus for moving an excimer laser beam relative to a workpiece to control the wall profile of laser machined features, such as holes and grooves. An excimer laser beam is displaced relative to a workpiece in a substantially circular motion and the substantially circular motion is further displaced relative to the workpiece to correspond to a desired shape.

7 Claims, 5 Drawing Sheets

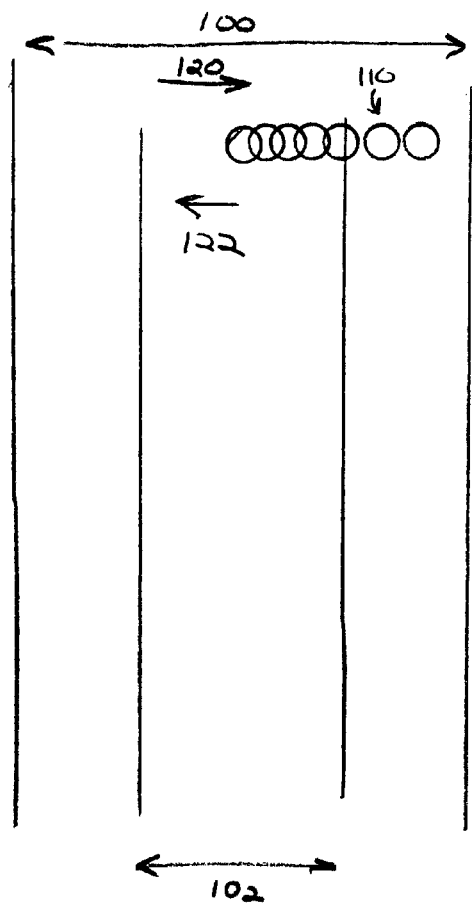
Fig. 5
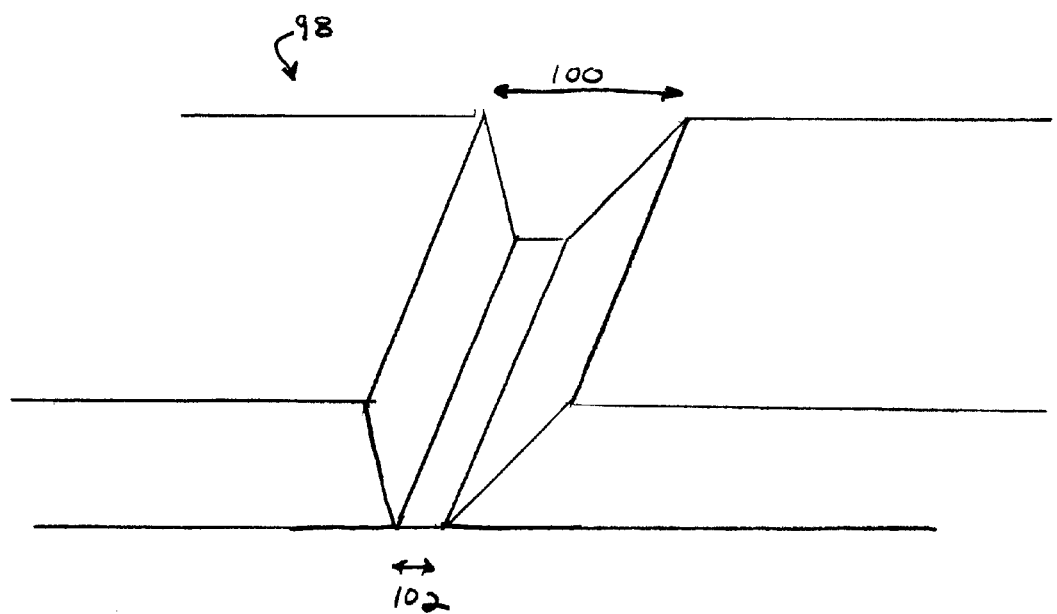

METHOD AND APPARATUS FOR CONTROLLING THE TAPER ANGLE OF THE WALLS OF LASER MACHINED FEATURES

FIELD OF INVENTION

The present invention relates generally to a method and apparatus for controlling the wall profile of laser machined features, such as holes and grooves. More specifically, it relates to a system for moving a laser beam relative to a workpiece to machine the walls of the machined features therein to achieve a desired profile.

BACKGROUND OF THE INVENTION

In the manufacture of certain products, features, such as holes and grooves, are produced in workpieces by ablating the workpiece material with a laser beam, e.g., Gugger U.S. Pat. No. 3,576,965. When a laser, such as an excimer laser, ablates a hole or groove, it exhibits a small "natural" taper. A taper of 5–9 degrees half angle is typical for laser machined holes in many plastics such as polyamide and polyester. This natural taper varies slowly with laser beam energy density, wavelength and numerical aperture. However, these parameters are difficult to control. Moreover, where a larger taper angle is required, it is necessary to use a different approach.

One approach involves controlling (a) the angle of the laser beam striking the workpiece relative to the axis of a hole being machined and (b) the distance between the intersection of the beam with the surface of the workpiece and the axis of the hole. Corfe et al. U.S. Pat. No. 5,043,553. This approach is, however, difficult to implement because of its inherent complexity and, for an excimer laser, because of the difficulty in focusing the laser across the image field.

Other approaches attempt to control wall taper angle by controlling the fluence used in a laser beam or by refocusing a projection lens. These approaches have only limited success. See Sheets U.S. Pat. No. 4,940,881.

Finally, another approach involves displacing a laser beam relative to a workpiece. One way to do this involves interposing a thin refractive disc in the laser beam and rotating the refractive disc not about its axis but instead about the optical axis or an axis parallel to it, a so-called "wobble plate." In a preferred embodiment, the refractive disc has parallel faces and is inclined at a small angle to a reference plane perpendicular to the optical axis. In another embodiment, the faces of the refractive element are at a small angle to each other. Sheets U.S. Pat. No. 4,940,881. In the preferred embodiment, the taper angle of the wall is dependent on the angle at which the refractive element is inclined. It has, however, proven time consuming to change that angle in practice, and the required apparatus for rotating the refractive disc is relatively large and complicated.

It is an object of the present invention to move a laser beam relative to a workpiece to machine the taper angle of the walls of laser machined features therein, such as holes and grooves, at specified angles, which angles may be readily and remotely changed. It is also an object of the present invention to move a laser beam relative to a workpiece to machine the walls of the machined features therein to achieve other desired profiles.

SUMMARY OF THE INVENTION

A new method and apparatus for moving an excimer laser beam relative to a workpiece to control the wall profile of laser machined features, such as holes and grooves. In a preferred embodiment, an excimer laser beam is displaced relative to a workpiece in a substantially circular motion and the substantially circular motion is further displaced relative to the workpiece to correspond to a desired shape.

The foregoing and other objects, features and advantages of the current invention will be apparent from the following detailed description of preferred embodiments of the invention as illustrated in the accompanying drawings.

IN THE DRAWINGS

FIG. 5 illustrates a distribution of laser pulses for machining a groove with a tapered wall angle resulting from a reciprocal motion of a laser beam and a workpiece.

DETAILED DESCRIPTION OF THE INVENTION

Excimer lasers are used to micromachine workpieces of various materials. Each pulse of an excimer laser removes only a very thin layer of material of the order of 0.1–0.2 microns. It is possible therefore to sculpt a desired cross section shape of the features to be micromachined into the material by displacing the laser beam relative to the workpiece and controlling the number of pulses applied in a given location. For example, if the center of a hole to be drilled in the workpiece is exposed to more pulses then the outer edge of the hole, the profile of the resulting hole will be tapered.

Figure 1:
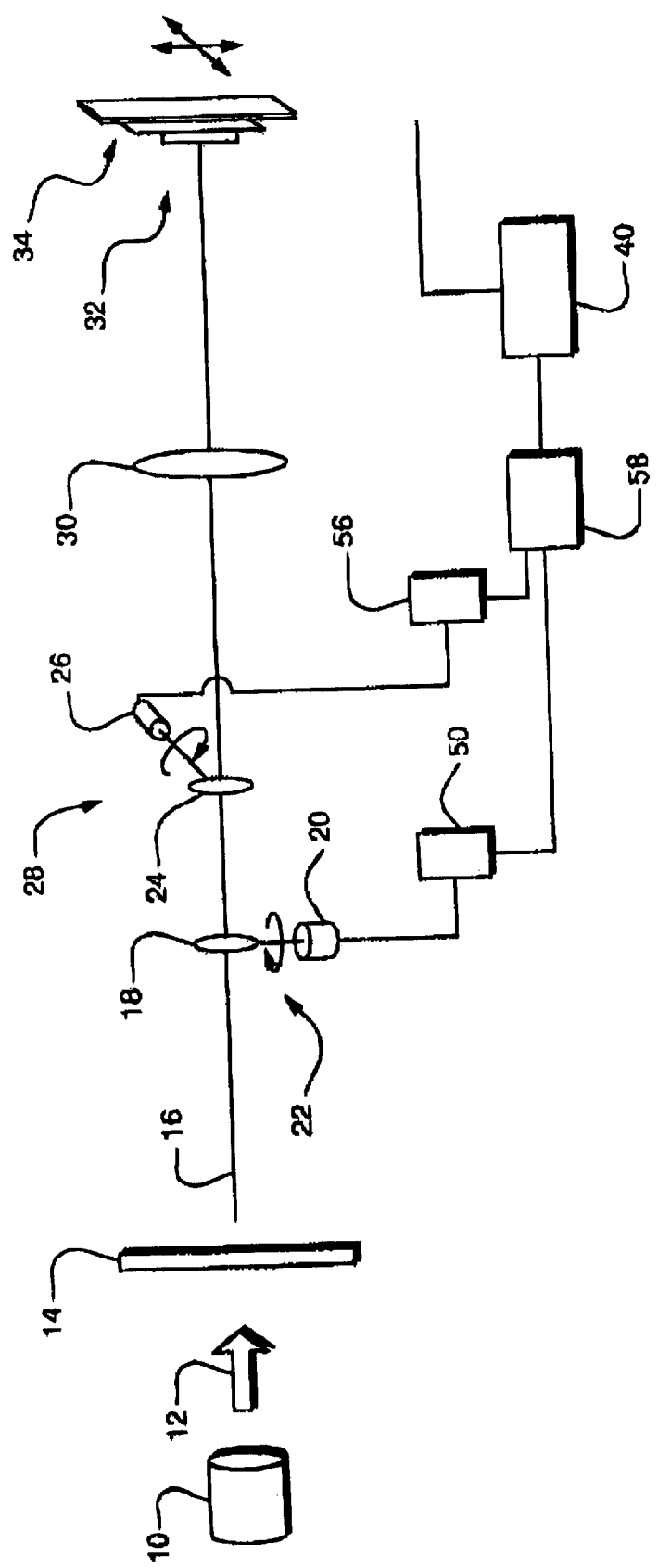
FIG. 1 is a schematic of a preferred embodiment of the present invention.

FIG. 1 is a schematic of a preferred embodiment of the present invention. An excimer laser 10 projects a laser beam 12 on to and through a mask 14, which contains a pattern of holes or openings. The mask 14 may, in another embodiment, be mounted on a motorized rotary or linear translation stage so that the pattern to be machined may be selected from among a series of patterns in the mask.

The laser beam continues along optical path 16 on to and through a first flat transparent refractive plate 18. The first refractive plate 18 is disposed perpendicularly to the optical path 16. The first refractive plate 18 is preferably formed of a material minimizing absorption of ultraviolet light from the laser beam 12, preferably having a thickness in the range of 0.5–6.0 mm. The first refractive plate 18 is mounted on a first scanner 20 that can rotate the first refractive plate 18 about a first axis 22 perpendicular to the optical path 16. In a preferred embodiment, the scanner is a galvanometer.

Rotating the first refractive plate 18 about the first axis 22 causes the laser beam to be displaced in a linear direction perpendicular to the first axis 22.

The laser beam continues along optical path 16 onto and through a second flat transparent refractive plate 24. The second refractive plate 24 is disposed perpendicularly to the optical path 16 and is made of similar material and a similar shape as the first refractive plate 18. The second refractive plate 24 is mounted on a second scanner 26 that can rotate the second refractive plate 24 about a second axis 28 perpendicular to the optical path 16 and at an angle, preferably perpendicular to the first axis 22. In a preferred embodiment, the second scanner is also a galvanometer. Rotating the second refractive plate 24 about the second axis 28 causes the laser beam to be displaced in a linear direction perpendicular to the second axis 28.

The laser beam continues along optical path 16 onto and through a projection lens 30 that sharply focuses the mask image on a workpiece 32. The laser beam is deflected by the rotation of the refractive plates. For small scan angles, the deflection on the workpiece is given by:

$$\Delta = M \cdot \frac{(n-1)}{n} \cdot d \cdot \theta_i$$

where M is the demagnification of the projection lens, n and d are the index of refraction and thickness respectively of the refractive plate and θ, is the scan angle.

The workpiece 32 is mounted on a worktable 34. In a preferred embodiment, the work table comprises two motorized stages for linear movement in two substantially orthogonal directions. The work table 34 is connected to a computer 40. The computer 40 can control the linear motion of the work table 34 and workpiece 32 in two directions, which directions are perpendicular to the optical axis, and at an angle, preferably perpendicular, to each other.

The first scanner 20 is connected to a first driver 50, and the second scanner 26 is connected to a second driver 56. In a preferred embodiment, the drivers are analog servo amplifiers for driving the scanners. The first driver 50 and second driver 56 are connected to a controller 58. The controller 58 takes digital input from a computer, for example a scan pattern, and converts it to analog voltage output to activate the first driver 50 and the second driver 56. The controller is, in turn, connected to a computer 40. Thus, scan patterns can be entered in the computer 40. The computer 40 can cause the displacement of the laser beam 12 in relation to the workpiece 32 in two linear directions, which are at an angle to each other and orthogonal to the optical axis 16. The computer can cause the displacement by either one of two techniques or by a combination of the two techniques. The first technique involves the displacement of the laser beam 12 through the use of the first scanner 18 and the second scanner 24 as described in detail above. The second technique involves the displacement of the workpiece 32 on the work table 34, also as described in detail above.

Figure 2A:
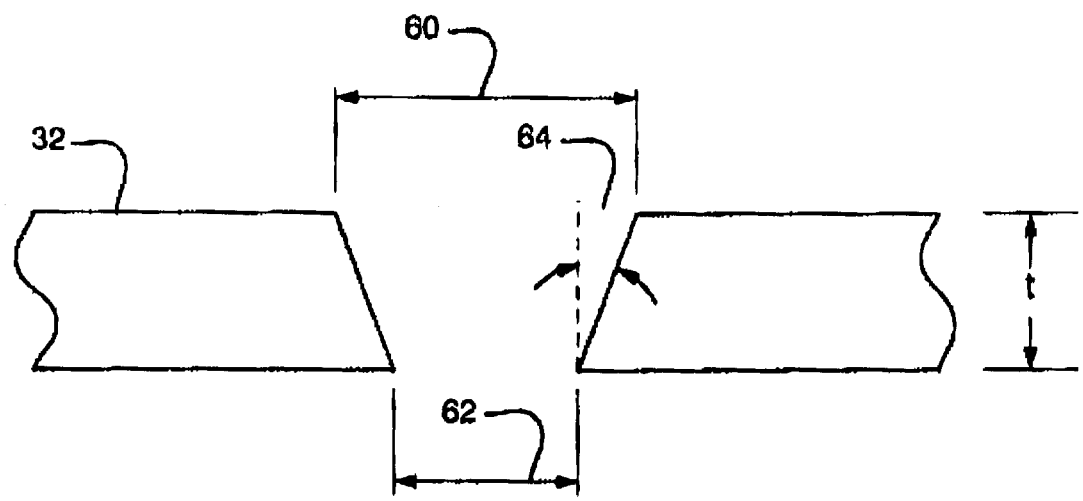
FIG. 2 illustrates different side profiles of the walls of a machined hole.
Figure 2B:
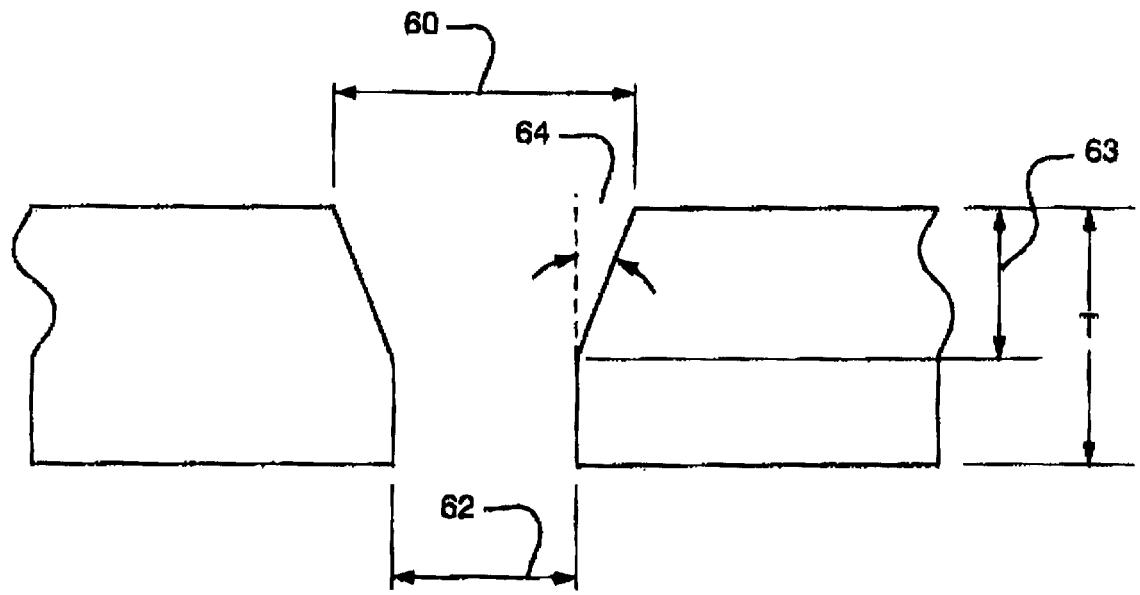
Figure 3:
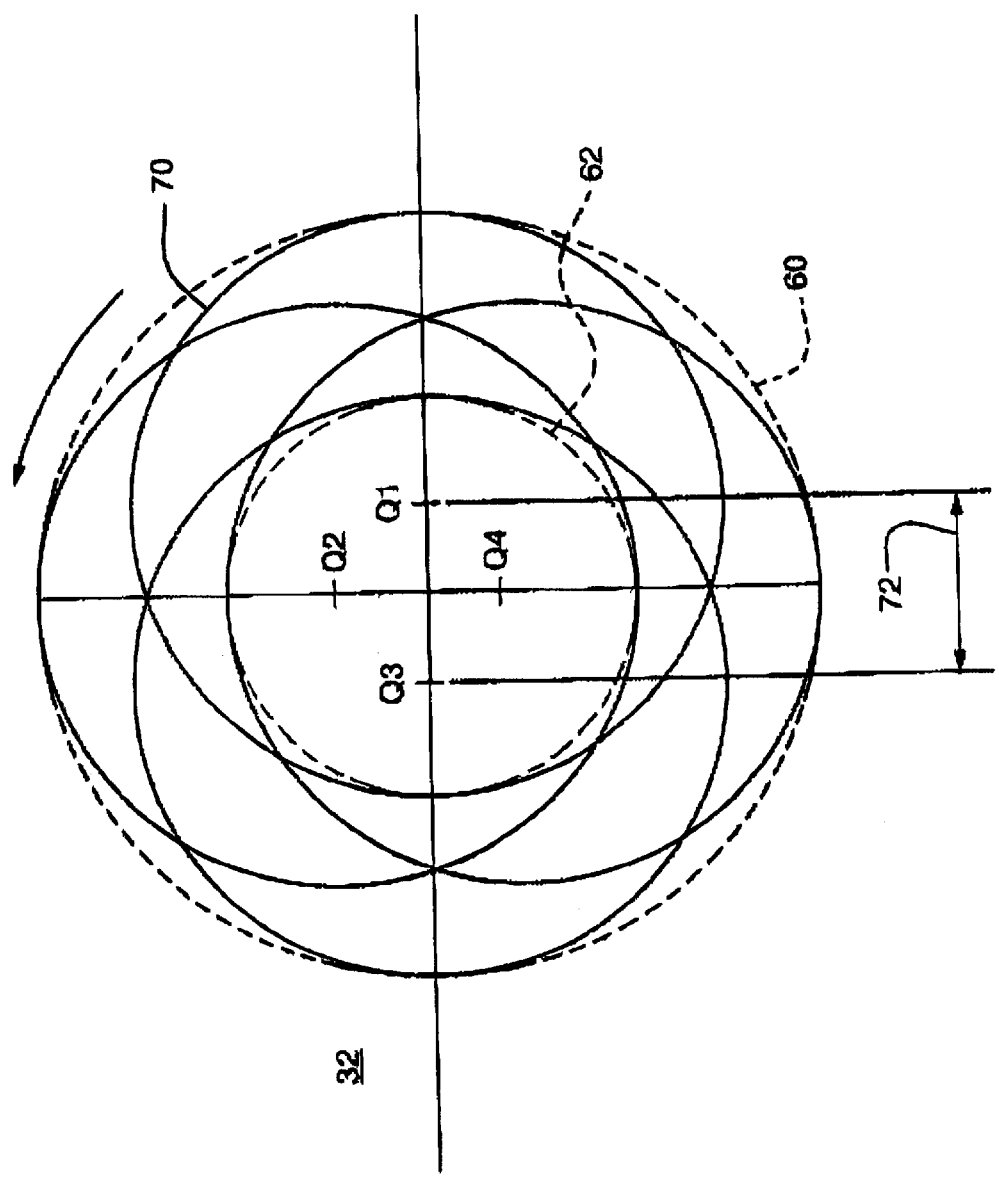
FIG. 3 illustrates a preferred distribution of laser pulses for machining a hole with a wall taper angle resulting from a relative circular motion of a laser beam and a workpiece.

As an example of the use of a preferred embodiment of the present invention, as is shown in FIG. 2, one may desire to drill a hole through a workpiece 32 with an entrance diameter $D_i$ (60), and an exit diameter of $D_o$ (62), thereby causing the taper angle of the walls of the hole A (64) to be fixed. Referring to FIG. 3, in order to drill such a hole, the laser beam is imaged on the workpiece into a disc of diameter $D_x$ (70), which image is slightly smaller than the entrance hole diameter $D_i$ (60) of the hole that is to be machined but larger than the exit hole diameter $D_o$ (62) of the hole. A relative circular motion is induced between the laser beam and the workpiece such that the center of the laser beam traces a circle of diameter $D_R$ (72). The relative circular motion is induced by displacing the laser beam according to the present invention or displacing the workpiece according to the present invention.

FIG. 3 illustrates how the laser pulses are distributed on the workpiece with this relative circular motion. The center area is exposed by many more pulses than the outer region. This results in a differential exposure rate along the radius of the hole, resulting in the desired wall taper shown in FIG. 2. The wall taper angle is controlled by controlling the diameter of the laser beam image $D_x$ (70) and the diameter of the circular motion $D_r$ (72) of the center of the laser beam. In first approximation, we have:

$$Di=Dx+Dr$$

$$Do=Dx-Dr$$

The total exposure time must be properly adjusted. The inner area of the hole is exposed longer than the outer area of the hole. The laser exposure is stopped when the inner area of the hole is drilled through the desired depth. This depth is the thickness of the material for through holes, but it can be smaller than the thickness of the material for a blind hole. For a through hole, the exposure time must be controlled tightly such that the inner region just drills through the thickness of the material. If the exposure is increased much beyond this point, the taper angle becomes steeper and the exit hole diameter Do increases.

The present invention may also be used to achieve more complex side-wall profiles. Displacement of the laser beam by the first and second scanners and displacement of the workpiece by the worktable are fully programmable. Also, the mask pattern to be used may be changed to achieve more complex side-wall profiles. For example, the "funnel" shape profile of the hole in FIG. 2b can be achieved by first using the preferred embodiment as described above to produce the wall angle taper of the wider part of the funnel to a given depth t (63). The diameter $D_r$ (72), as shown in FIG. 3, of the circle traced by the center of the laser beam is then decreased, preferably to zero, to produce the parallel wall profile of the narrower part of the funnel. Alternatively, a smaller diameter pattern in the mask can be chosen. The funnel profile is of interest for many microfluidic applications.

Figure 4:
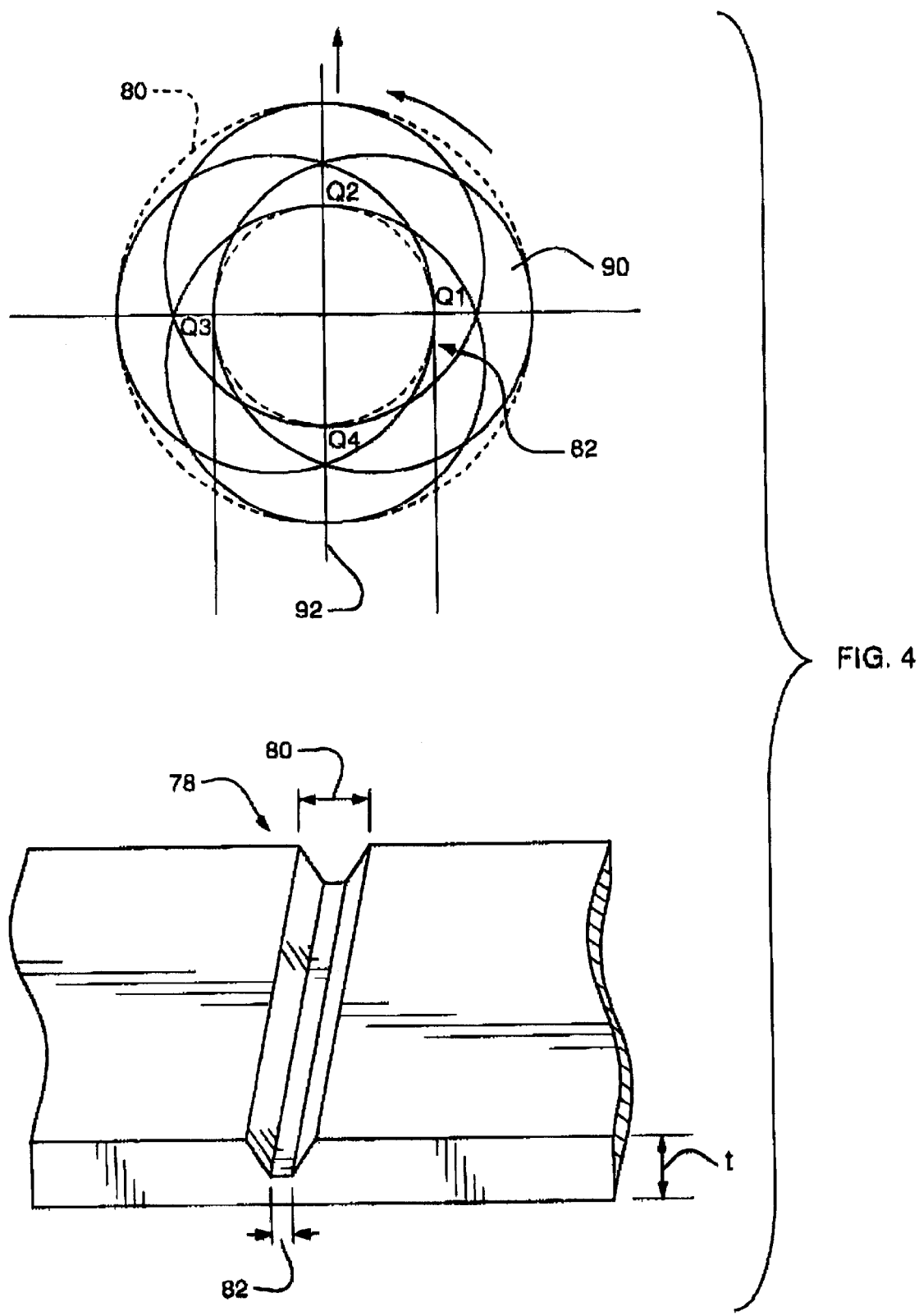
FIG. 4 is an elevated view of a groove machined with a preferred embodiment.

The side wall profiles of other features can also be machined with a similar approach. Referring to FIG. 4, one can control the taper angle of a laser machined groove using the present invention. To produce the groove 78 shown in FIG. 4, with top width $W_t$ (80) and bottom width $W_b$ (82), the laser beam is imaged on the workpiece into a disc of diameter $D_x$ (90), the diameter of which image is slightly smaller than the top width $W_t$ (80) that is to be machined but larger than the bottom width $W_b$ (82). A relative circular motion is induced between the laser beam and the workpiece such that the center of the laser beam traces a circle of diameter $D_r$ (92). The relative circular motion is induced by displacing the laser beam according to the present invention. The circular motion of the laser beam is then moved linearly along the direction of the groove (78) to be machined.

This results in the groove shown in FIG. 4 with the wall taper angle controlled by controlling the diameter of the laser beam image $D_x$ (90) and the diameter of the circular motion $D_r$ of the center of the laser beam such that:

$$W_t=Dx+Dr$$

$$W_o=Dx-Dr$$

An example of the use of another preferred embodiment of the present invention is shown in FIG. 5. To produce the groove 98 shown in FIG. 5, with top width $W_t$ (100) and bottom width $W_b$ (102) the laser beam is imaged on the workpiece into a disc of diameter $D_x$ (110), the diameter of which is slightly smaller than the top width $W_t$(100). A relative linear motion is induced between the laser beam and the workpiece, according to the present invention, such that the laser beam traces a linear path 120 transverse to the direction of the groove 98 to be machined. After the laser beam has traversed the top $W_t$(100) of the groove it is displaced relative to the workpiece, according to the present invention, to trace a linear path along the direction of the groove 98. After the displacement along the direction of the groove, another linear motion is induced between the laser beam and the workpiece such that the laser beam traces a linear path 122 transverse to the direction of the groove. The total exposure time must be properly adjusted at various points on the traces transverse to the groove to achieve the desired depth and wall taper angle for the groove.

In the preferred embodiments discussed above, with (i) two refractive plates mounted on galvanometric scanners or (ii) a movable worktable was used to produce relative displacement of the laser beam and the workpiece in two directions perpendicular to the optical path. Other techniques may be used to produce this relative displacement. For example, two mirrors mounted on galvanometric scanners or on gimbal mounts activated by linear activators such as piezoelectric activators may be used. Alternatively, the mask can be moved by a translation stage to move the mask pattern.

The present invention has been particularly shown and described above with reference to various professional embodiments, implementations and applications. The invention is not limited, however, to the embodiments, implementations or applications described above, and modification thereto may be made within the scope of the invention.

What is claimed is:

1. A method of controlling the wall profile of a feature machined in a workpiece by an excimer laser beam comprising relatively displacing the laser beam and the workpiece so that the wall profile Is controlled by the number of pulses of the laser beam applied in a given location wherein two refractive plates mounted in the path of the laser beam displace the laser beam in two directions at an angle to each other and orthogonal to the path of the laser beam.

2. The method of claim 1 further comprising projection the laser beam through a mask.

3. The method of claim 1 further comprising placing the workpiece on a work table and moving the work table in two directions that are at an angle to each other and orthogonal to the path of the laser beam.

4. The method of claim 1 in which relatively displacing the laser beam and the workpiece further comprises relatively displacing in a substantially circular motion the laser beam and the workpiece and further displacing the substantially circular. motion relative to the workpiece.

5. The method of claim 3 in which relatively displacing the laser beam and the workpiece further comprises relatively displacing in a substantially circular motion the laser beam and the workpiece and further displacing the substantially circular motion relative to the workpiece.

6. A The method of claim 1 in which the laser beam is imaged on the workpiece in a disc of diameter $D_x$, which image is slightly smaller than the entrance hole of diameter $D_i$ of the hole to be machined but larger than the exit hole of diameter $D_o$ and the induced relative circular motion is such that the center of the laser beam traces a circle of diameter $D_r$ in which, in approximation, $Di=Dx+Dr$ $Do=Dx-Dr.$ 7. The method of claim 5 in which the laser beam is imaged on the workpiece in a disc of diameter $D_x$, which image is slightly smaller than the entrance hole of diameter $D_i$ of the hole to be machined but larger than the exit hole of diameter $D_o$ and the induced relative circular motion is such that the center of the laser beam traces a circle of diameter $D_r$ in which, in approximation, $Di=Dx+Dr$ $Do=Dx-Dr.$

* * * * *